US012742741B2

(12) United States Patent
Hasan et al.

(10) Patent No.: US 12,742,741 B2
(45) Date of Patent: Sep. 22, 2026

(54) SCANNING PARTS AT TARGET TEMPERATURES

(71) Applicant: West Pharmaceutical Services, Inc., Exton, PA (US)

(72) Inventors: Md Abu Hasan, Exton, PA (US); Ngoc Van Le, Scottsdale, AZ (US); Linda M. Trebing, Wayne, PA (US); Patrick Shambayati, Carefree, AZ (US)

(73) Assignee: West Pharmaceutical Services, Inc., Exton, PA (US)

(*) Notice: Subject to any disclaimer, the term of this patent is extended or adjusted under 35 U.S.C. 154(b) by 128 days.

(21) Appl. No.: 18/836,016

(22) PCT Filed: Feb. 6, 2023

(86) PCT No.: PCT/US2023/062055

§ 371 (c)(1), (2) Date: Aug. 6, 2024

(87) PCT Pub. No.: WO2023/150755

PCT Pub. Date: Aug. 10, 2023

(65) Prior Publication Data

US 2025/0116618 A1 Apr. 10, 2025

Related U.S. Application Data

(60) Provisional application No. 63/307,281, filed on Feb. 7, 2022.

(51) Int. Cl.

*G01N 23/046* (2018.01)
*G01B 5/00* (2006.01)
*G01B 15/00* (2006.01)

(52) U.S. Cl.

CPC ......... *G01N 23/046* (2013.01); *G01B 5/0014* (2013.01); *G01B 15/00* (2013.01);

(Continued)

(58) Field of Classification Search

CPC ......... G01N 23/046; G01N 2223/3103; G01N 2223/419; G01N 2223/426; G01B 5/0014; G01B 15/00

See application file for complete search history.

(56) References Cited

U.S. PATENT DOCUMENTS

2021/0003517 A1 1/2021 Song et al.

FOREIGN PATENT DOCUMENTS

| | | | | |
|---|---|---|---|---|
| CN | 109270093 A | * | 1/2019 | ........... G01N 23/046 |
| CN | 110 044 752 A | | 7/2019 | |
| CN | 112 255 111 A | | 1/2021 | |

OTHER PUBLICATIONS

International Search Report issued in PCT/US2023/062055 dated Jul. 10, 2023.

Written Opinion issued in CT/US2023/062055 dated Jul. 10, 2023.

* cited by examiner

*Primary Examiner* — Kiho Kim

(74) *Attorney, Agent, or Firm* — Blank Rome LLP

(57) ABSTRACT

Computed tomography (CT) scanning while a part is maintained at low temperatures is described. A system includes a CT scan machine performing at least one 360° CT scan of the part. The system also includes a cooler to contain and maintain the part at the low temperature during the CT scans. The cooler includes a chamber and a cooling material provided within the chamber sufficient to maintain the part at the low temperature during the CT scans. The cooler includes a holder provided within the chamber that holds the part within a region of the chamber that substantially surrounds the part and that provides the CT scanner a 360-degree view of the part unobstructed by the cooling material.

20 Claims, 3 Drawing Sheets

(52) U.S. Cl.
CPC ................ *G01N 2223/3103* (2013.01); *G01N 2223/419* (2013.01); *G01N 2223/426* (2013.01)

SCANNING PARTS AT TARGET TEMPERATURES

CROSS-REFERENCE TO RELATED APPLICATIONS

This application is a National Stage of International Patent Application No. PCT/US2023/062055, filed Feb. 6, 2023, which claims the benefit of U.S. Provisional Patent App. No. 63/307,281, filed Feb. 7, 2022, the disclosures of which are hereby incorporated by reference herein in their entireties.

TECHNICAL FIELD

The present invention generally relates to systems and methods for computed tomography (CT) scanning at target temperatures including low temperatures.

BACKGROUND

Many medicaments need to be stored at low temperatures (e.g., −40° C. or lower) to maintain therapeutic efficacy. Parts associated with storing such medicaments, for example syringe-piston and vial-stopper systems, are typically evaluated at temperatures significantly higher than what is required to store such medicaments, such as at ambient temperature. But at low temperatures parts typically shrink due to thermal contraction. When medicament is stored at low temperatures in assemblies, such as syringe-piston or vial-stopper, different parts of the assemblies can contract different amounts or at different rates since different parts or materials of construction may have different coefficients of thermal expansion. This can lead to interface openings and gaps between parts, which can compromise the ability of the assemblies to hold the medicament.

Understanding the dimensional changes of each part associated with storing medicaments at low temperatures is important for proper storage of such medicaments. Though the impact of cooling parts to low temperatures can be consequential, the dimensional changes can also be quite small (e.g., micron-level) and some physical measurement techniques, such as those that utilize calipers or gages, can lack the sensitivity necessary to detect the changes. Accordingly, there is a need for a measurement technique that can detect these dimensional changes resulting from cooling parts to low temperatures.

X-ray computed tomography (CT) scans can produce accurate and reliable three-dimensional images of parts at room temperature. CT scans can involve multiple passes by the scanner to achieve a sufficient resolution for the three-dimensional images. These images can be analyzed to obtain measurements of the part dimensions. Due to the nondestructive nature and high resolution of CT scanning, part dimensions can be inspected with high fidelity.

Pre-frozen parts can be CT scanned. But without management, parts that are pre-frozen will rise in temperature while the multiple pass scans are being performed as the part rotates within the scanning equipment. Thermal expansion can change the part dimensions concurrently with the rise in temperature, which can compromise the accuracy of the image generated from the scans. Thus, a need exists for systems and methods that can allow parts to be CT scanned while the parts are maintained at low temperatures during the entirety of the scan (e.g., between 15 to 60 minutes).

SUMMARY

These needs are met, to a great extent, by a system for scanning a part. The system includes a computed tomography scan machine that includes a platen and a scanner configured to perform at least a 360° computed tomography scan of the part over a period of time. The system also includes a cooler arranged on the platen, where the cooler is configured to contain and maintain the part at a target temperature of 0° C. or below during the period of time. The cooler includes a chamber, a cooling medium provided within the chamber that is configured to absorb an amount of heat from the part sufficient to maintain the part at the target temperature during the period of time, and a holder provided within the chamber. The holder is configured to hold the part within a region of the chamber that substantially surrounds the part and is configured to provide the scanner a 360-degree view of the part unobstructed by the cooling medium.

Implementations may include one or more of the following features. The system where the target temperature is 0° C. or below; and as low as −196° C. The period of time is between 15 and 60 minutes. The cooler may include a wall that is radiolucent and that substantially or completely surrounds the holder. The wall is insulative. The cooling medium may be passive and may include dry ice or liquid nitrogen. The system may include a sensor that is configured to measure the temperature within the cooler during the period of time. The part may include a component of a syringe-piston or of a vial-stopper system. The part may include an assembly of the syringe-piston or the vial-stopper system.

One general aspect includes a cooler for holding and maintaining a part at a target temperature during a computed tomography scan. The cooler also includes a plurality of walls that define a chamber, the plurality of walls includes side walls and may include a material that is radiolucent. The cooler also includes a first and a second cooling medium respectively arranged in a top and a bottom of the chamber, the first and second cooling medium are together configured to cool the part to the target temperature and maintain the part at the target temperature during an entire period of the computed tomography scan. The cooler also includes a holder arranged between the first and second cooling medium that is configured to hold the part in a region of the chamber where the part is completely or substantially surrounded by the side walls and an entirety of the part is between and spaced apart from each of the first and second cooling medium.

Implementations may include one or more of the following features. The cooler where the plurality of walls may include a removable lid. The plurality of walls includes at least one opening, and the holder is an insert that extends through at least one opening into the region of the chamber. The holder includes a first body and a second body, the first body includes a cavity configured to hold the part at a desired angle and position, and the second body is configured to be inserted into the first body to secure the part within the cavity. The first body separates the chamber into a first compartment and a second compartment that respectively house the first and second cooling medium.

One general aspect includes a method of evaluating a tolerance of a part at a target temperature. The method of evaluating also includes cooling the part to the target temperature, where the target temperature is 0° C. or below, as low as −196° C. The method of evaluating also includes imaging the part with the computed tomography scan machine while maintaining the part at the target temperature. The evaluating also includes evaluating the tolerance of the part at the target temperature based on the imaging.

Implementations may include one or more of the following features. The method where evaluating the tolerance of the part at the target temperature based on the imaging may include: determining a dimension of the part at the target temperature based on the imaging, and comparing the dimension of the part at the target temperature to a dimension of the part at an ambient temperature. Evaluating the tolerance of the part at the target temperature based on the imaging further may include determining that the part at the target temperature is within the tolerance based on the comparing of the dimension of the part at the target temperature to the dimension of the part at the ambient temperature. Evaluating the tolerance of the part at the target temperature based on the imaging further may include determining that the part at the target temperature is outside of the tolerance based on the comparing of the dimension of the part at the target temperature to the dimension of the part at the ambient temperature. Determining the dimension of the part at the ambient temperature may include: imaging the part with the computed tomography scan machine with the part at the ambient temperature; and determining the dimension of the part at the ambient temperature based on the imaging. The part is associated with containment of a medicament. The part is associated with a syringe-piston or vial stopper system. The target temperature is 0° C. or below.

Implementations of the described techniques may include hardware, a method or process, or computer software on a computer-accessible medium. Various additional features and advantages of this invention will become apparent to those of ordinary skill in the art upon review of the following detailed description of the illustrative embodiments taken in conjunction with the accompanying drawings.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION OF ILLUSTRATIVE EMBODIMENTS

The systems and methods of this disclosure can allow the parts to be cooled and maintained at low temperatures during the entirety of one or more CT scan. Data collected from CT scans performed on parts maintained at low temperatures, such as parts associated with containment of medicament, can be used to evaluate part tolerances and potential gaps or defects at such low temperatures. By utilizing radiolucent materials and by arranging structures that could interfere with x-rays in a manner so as to not obstruct the view of the scanner with the part, noise can be minimized, and these systems and methods can produce high-quality images of low temperature parts. It is important to note that at the predetermined target temperature, a combination of materials and part geometries can cause the part or assembly to contract at different amounts in different locations on the same part. The 3D nature of computed tomography enables visualization of this behavior, and the present system and process allows this visualization at the predetermined target temperature. These and other aspects are described in further detail in the description of FIGS. 1-4 below.

Figure 1:
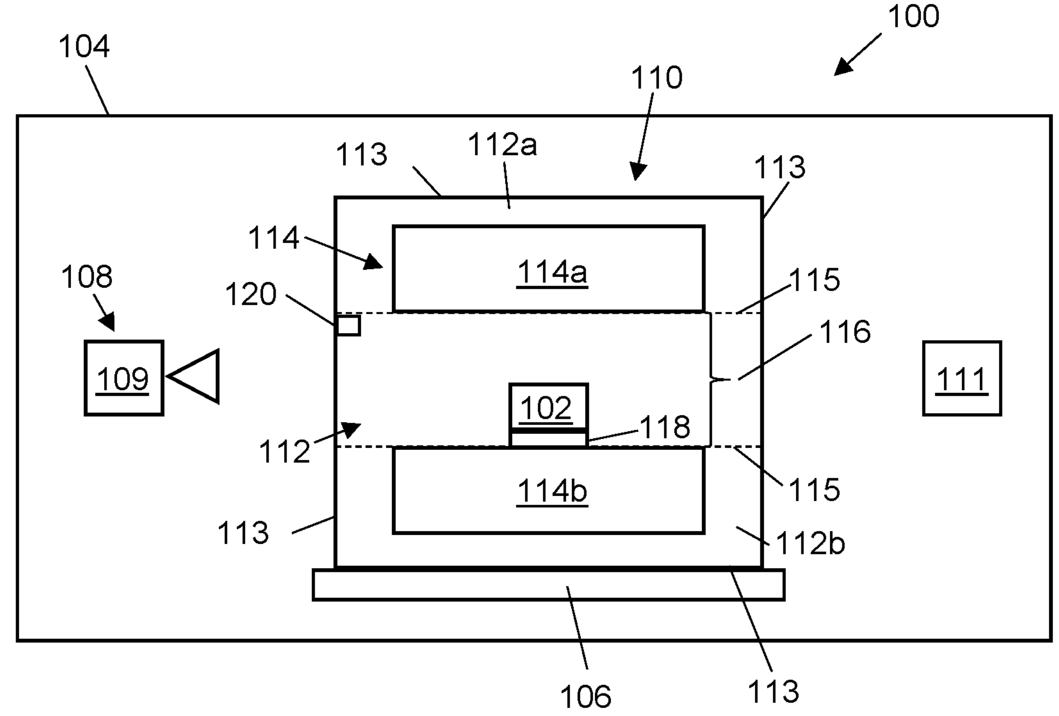
FIG. 1 shows a system for scanning a part maintained at a predetermined target temperature in accordance with aspects of the invention.

FIG. 1 illustrates a system 100 for scanning a part 102 while part 102 is maintained at a predetermined target temperature according to aspects of the present invention. System 100 can include a CT machine 104, which can include a platen 106 and a scanner 108. Scanner 108 can include an X-ray source 109 and a detector 111. During a scan, part 102 can be disposed between X-Ray source 109 and detector 111. In embodiments, platen 106 can rotate relative to the X-ray source 109 and detector 111 to provide a 360° view of part 102 disposed on platen 106, with detector 111 opposite the X-ray source 109 and the part 102 between. Alternatively, platen 106 can be stationary, and the X-ray source 109 and associated detector 111 can rotate together around platen 106 while maintaining a view of part 102 disposed on platen 106 to provide a 360° view of part 102. System 100 can include a cooler 110 that can contain part 102, cool part 102, and maintain part 102 at or below a predetermined target temperature during the entirety of the CT scan, e.g., for between 15 and 60 minutes. Cooler 110 can be provided on platen 106 of CT machine 104. Cooler can be provided within CT machine 104. Cooler 110 can be sized to both contain part 102 and fit within and/or on CT machine 104.

Predetermined target temperature can be a temperature relevant to a use of part 102. For example, in embodiments in which part 102 is associated with containment of a medicament that is stored at low temperatures predetermined target temperature can correspond to the low temperature that the medicament is intended to be stored at or may be subjected to during transit. In embodiments, predetermined target temperature can be a temperature at or between −0° C. and −196° C. In embodiments, predetermined target temperature can be −45° C. or lower, −80° C. or lower, or −196° C. or lower.

In embodiments, part 102 can be cooled to predetermined target temperature prior to being placed in cooler 110, and cooler 110 can maintain predetermined target temperature during entirety of CT scan, e.g., for between 15 and 60 minutes. This can be advantageous for example for reducing the formation of ice crystals on part 102, reducing cooling demands of cooler 110, increasing the amount of time available for scanning, etc.

Though some embodiments described herein pertain to cooling part 102 and/or maintaining part 102 at low or ultralow temperatures, cooler 110 can additionally or alternatively include a heater that can raise the temperature of part 102 to a predetermined target temperature at or above ambient temperature and/or maintain part 102 at such an elevated temperature for the entirety of the CT scan. Accordingly, in embodiments dimensional changes of part 102 at elevated temperatures can be evaluated using cooler 110. As such, the terms "cooler" and/or "cooling medium" as used herein are not limited to structures associated with cooling and/or maintaining part 102 at temperatures below ambient temperature and can also include structures associated with heating and/or maintaining part 102 at temperatures above ambient temperature.

Cooler 110 can include a chamber 112. In embodiments, chamber 112 can be a rectangular prism shape. Alternatively, chamber 112 can be a square prism shape or a cylindrical shape. Chamber 112 can be defined by a plurality of walls 113 of cooler 110. Plurality of walls 113 can help maintain the temperature of part 102 within chamber 112 without obstructing a view of part 102 from the X-ray source 109 and associated detector 111. For example, any of plurality of walls 113 that define chamber 112 can comprise a material that is radiolucent. Any of plurality of walls 113 that define chamber 112 can comprise a material that is insulative. Any of the plurality of walls 113 that define chamber 112 can comprise a material that is both radiolucent and insulative, such as for example a closed cell foam (e.g., extruded polystyrene foam or expanded polyethylene). One or more of plurality of walls 113 can be removable. For example, one or more walls 113 can be a removable lid that can provide access to the chamber 112, which can allow for maintenance and/or replacement of the part 102, a cooling medium 114 where the part is cooled and maintained, etc. Plurality of walls 113 can be molded together or joined, for example with an adhesive.

Cooler 110 can include a cooling medium 114 provided within chamber 112. The term "cooling medium" as used herein can mean a substance or device that cools the part 102 or maintains the part 102 at a predetermined temperature and can include both passive and active cooling mediums, as discussed herein. Cooling medium 114 can cool part 102 to and/or maintain part 102 at the predetermined target temperature during the entirety of the CT scan. In embodiments, cooling medium 114 can comprise radiolucent materials. In embodiments, cooling medium 114 can comprise radiopaque materials.

The cooling medium 114 can be passive, i.e., cooled using an external source of energy prior to placement in cooler 110 and that may not receive energy from the external source of energy after placement in cooler 110. In embodiments, passive cooling medium can be cooled before the CT scan to a temperature sufficient to cool and maintain part 102 to lower temperature of part 102 to the predetermined target temperature and/or to maintain part 102 at the predetermined target temperature for the entirety of the CT scan. For example, cooling medium 114 can include solid carbon dioxide (i.e., dry ice), liquid nitrogen, or other substance that can sufficiently cool part 102 to predetermined target temperature and/or maintain part 102 at predetermined target temperature. In embodiments, the cooling medium 114 includes dry ice, which can be advantageous for embodiments in which part 102 is associated with medicament storage. This is because dry ice can be used during shipment to maintain medicament at low temperatures, and imaging parts and performing the CT scan with the same material used in to maintain medicament during shipment can reveal changes to part 102 under storage conditions that the part 102 would be subjected to during shipment. Additionally or alternatively, cooling medium 114 can be active, i.e., can cool using an external energy source to actively remove (e.g., pump) heat from cooler 110 before and/or during the CT scans.

In embodiments, the cooling medium 114 can include a plurality of cooling mediums. For example, cooling medium 114 can include a first cooling medium **114*a* and a second cooling medium 114*b* within chamber 112. In embodiments, first cooling medium 114*a* can be provided above part 102 and second cooling medium 114*b* can be provided below part 102. This arrangement can help cool part 102 to and maintain part 102 at the predetermined target temperature while providing a compact footprint that fits on and/or within CT machine 104. Alternatively, system 100 can include only a single cooling medium 114**.

A region 116 can be provided within chamber 112 and part 102 can be provided within region 116. Region 116 can completely surround part 102 and can provide a 360° view for X-ray source 109 and detector 111 that is unobstructed by cooling medium 114, which can include radiopaque materials such as dry ice. According to this arrangement, X-ray source 109 and detector 111 can be directed at part 102 throughout the entirety of the CT scan, and region 116 can provide X-ray source 109 and detector 111 with a 360° view of part 102 unobstructed by cooling medium 114, which can improve the quality of the CT scan by reducing and/or eliminating radiopaque materials between X-ray source 109, part 102, and detector 111. Alternatively, embodiments in which cooling material 114 comprises radiolucent materials, cooler 110 can be provided without region 116 and cooling medium 114 can partially or completely surround part 102.

In embodiments, region 116 can be bounded by inner walls 115 of cooler 110. Inner walls 115 can include any of the same materials of plurality of walls 113, discussed above, and/or can include different materials than those included in plurality of walls 113. In embodiments, inner walls 115 and plurality of walls 113 can define first and second compartments **112*a*, 112*b* of chamber 112. First compartment 112*a* can house first cooling medium 114*a* and second compartment 112*b* can house second cooling medium 114*b*. First and second compartments 112*a*, 112*b* can separate first cooling medium 114*a* and second cooling medium 114*b* from region 116. In embodiments, one or both of inner walls 115 can include openings that can promote heat transfer between region 116 and compartments of chamber 112. Inner walls 115 can protect region 116 from moisture, debris, or other artifacts associated with cooling medium 114. For example, inner walls 115 can form a liquid-tight seal that prevents liquid from entering region 116**.

Cooler 110 can include a holder 118 provided within chamber 112 that can hold part 102. Holder 118 can hold part 102 in thermal communication with cooling medium 114. Holder 118 can hold part 102 at a position within region 116 to provide X-ray source 109 and associated detector 111 with a 360° view of part 102 unobstructed by cooling medium 114. Holder 118 can partially or completely occupy region 116. In some embodiments in which holder 118 completely occupies region 116, inner walls 115 can be a part of holder 118. Holder 118 can include radiolucent materials such that holder 118 does not compromise the integrity of the CT scan of part 102. Holder 118 can allow positioning of the part at various angles, to allow for optimal scanning.

System 100 can include a sensor 120 for measuring conditions within region 116 and/or conditions of part 102. Sensor 120 can measure conditions within region 116 during the entire CT scan to verify that part 102 is scanned at the intended conditions. Sensor 120 can be arranged within region 116. Sensor 120 can be arranged offset from a line of sight between scanner 108 and part 102 such that sensor 120 does not obstruct a view from scanner 108 to part 102 at any position in a 360° scan of part 102. In embodiments, sensor 120 can be a temperature sensor for monitoring the temperature within region 116 and/or of part 102. Temperature sensor can be used to verify that part maintains predetermined target temperature during entire CT scan. In embodiments, cooling medium 114 can be an active cooling medium and system 100 can include a controller that controls the cooling medium to actively maintain the temperature of region 116 based on feedback from sensor 120.

Part 102 can be any part that can be arranged within cooler 110 and on and/or within CT machine 104. Part 102 can be a single component, multiple components, or one or more assemblies. For example, part 102 can be one or more components or assemblies associated with containment of a medicament at low temperatures, such as for example components or assemblies of syringe-piston or vial-stopper systems. In embodiments, part 102 can be a syringe-piston or vial-stopper system filled with medicament at low temperature. In embodiments, part 102 can be a component or assembly associated with aircraft or spacecraft or other vehicle or machine that operate at low temperatures. In embodiments, part 102 can be a component or assembly associated with batteries and/or electrical connections that operate in low temperature applications. In embodiments, part 102 can be a biological sample (e.g., animal or human tissue, plant samples, etc.), which should remain frozen to preserve the integrity of the biological sample after the CT scan. In embodiments, part 102 can be a lyophilization container.

Figure 2:
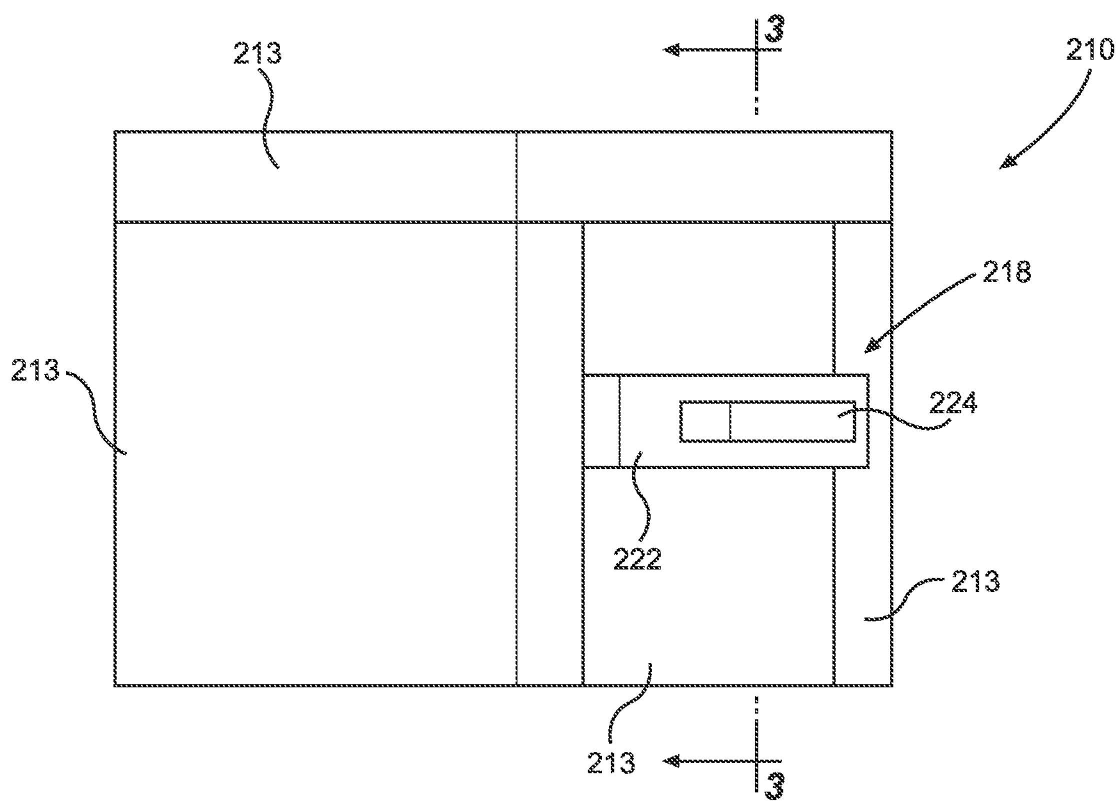
FIG. 2 shows a cooler for maintaining a part at a predetermined target temperature in accordance with aspects of the invention.
Figure 3:
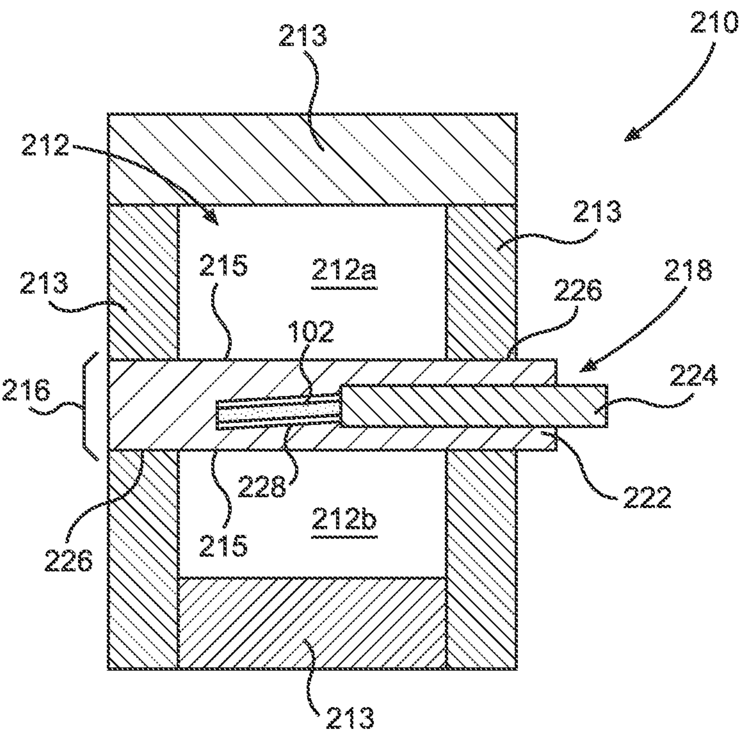
FIG. 3 shows section view of the cooler of FIG. 2 taken along line 3-3.

FIGS. 2 and 3 show a cooler 210 embodiment of system 100 in accordance with aspects of the invention. Cooler 210 can include any of the features discussed above in reference to cooler 110 and can include any of the following features.

Cooler 210 can be a rectangular prism. Cooler 210 can include a plurality of walls 213 and at least one wall 213 can be removable to provide access to chamber 212. Cooler 210 can include a holder 218. Holder 218 can comprise a radiolucent material so that holder 218 does not interfere with integrity of CT scan. Holder 218 can be an insert that can extend through openings 226 of one or more of walls 213.

Holder 218 can be a unitary structure. Alternatively, holder 218 can include a first body 222 and a second body 224. First body 222 can include a cavity 228 that can hold part 102 at a predetermined an angle and position relative to a line of sight of scanner 108, which can improve the quality of the CT scan. First body 222 can include a thermally conductive material to facilitate heat transfer from part 102 to heatsinks within cooler 210. First body 222 can include one or more holes that connect cavity 228 with chamber 212 and that can facilitate heat transfer from part 102 to heatsinks within chamber 212. Second body 224 can be inserted into first body 222 to secure part 102 within cavity 228. Second body 224 can include an insulative material that can insulate cavity 228 to help maintain part 102 at predetermined target temperature.

Holder 218 can separate chamber 212 into a first compartment 212*a* and a second compartment 212*b*, which as discussed above can respectively house first and second heatsinks. Holder 218 can include inner walls 215 that define region 216.

In embodiments, holder 218 can be inserted into chamber 212 through an opening created when a wall 213 (e.g., a lid) of cooler 210 is removed. According to this arrangement, walls 213 can be provided without openings 226.

Figure 4:
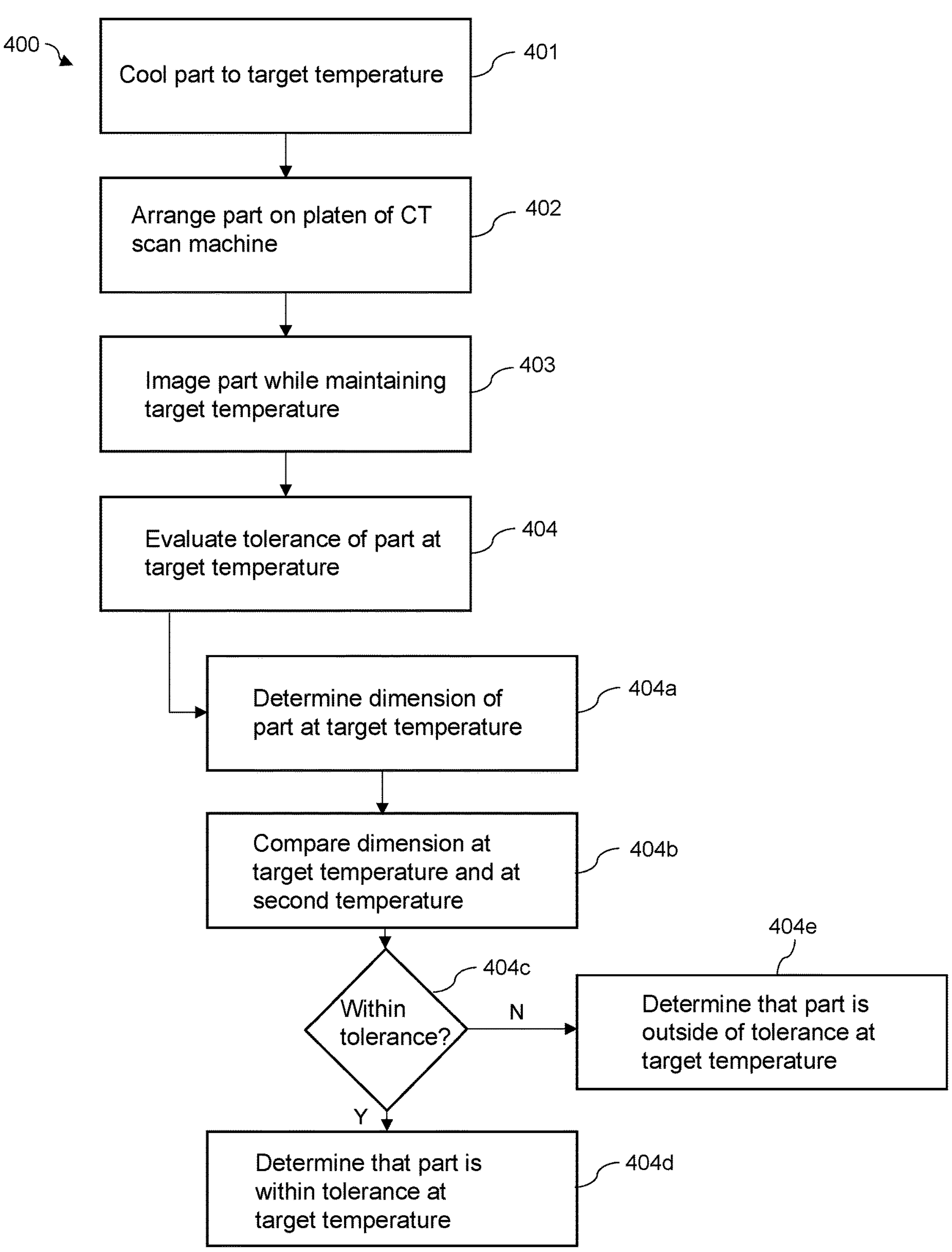
FIG. 4 shows a method of evaluating a tolerance of a part at a predetermined target temperature in accordance with aspects of the invention.

FIG. 4 shows a process 400 of evaluating a tolerance of part 102 at a predetermined target temperature. Process 400 can be implemented with system 100 including cooler 110 and/or cooler 210. Process 400 can include, at step 401, cooling part 102 to the predetermined target temperature. Predetermined target temperature can be any of the predetermined target temperatures discussed above, for example predetermined target temperature can be −45° C. or lower, −80° C. or lower, or −196° C. or lower. Part 102 can be cooled by cooler 110/210. Alternatively, part 102 can initially be cooled to the predetermined target temperature independently from cooler 110/210. For example, part 102 can initially be cooled to the predetermined target temperature in a commercial freezer. Further, in alternative embodiments the predetermined target temperature can be a temperature above ambient temperature and step 401 can include heating part 102 to the predetermined target temperature.

Process 400 can include, at step 402, arranging part 102 on platen 106 of CT machine 104. Arranging part 102 on platen 106 can include placing part 102 within holder 118/218 of cooler 110/210 and arranging cooler 110/210 on platen 106. That is, step 402 can include indirectly arranging part 102 on platen 106 via cooler 110/210. Step 402 can occur after step 401 such that part 102 is at the predetermined target temperature when arranged on platen 106. Alternatively, step 402 can occur before or concurrently with step 401 such that part 102 reaches the predetermined target temperature while arranged on platen 106.

Process 400 can include, at step 403, imaging part 102 with the CT machine 104 while maintaining part 102 at the predetermined target temperature during the entirety of the imaging (e.g., between 15 and 60 minutes). In embodiments, cooler 110/210 can maintain part 102 at the predetermined target temperature during the entirety of the imaging, as discussed above.

Process 400 can include, at step 404, evaluating the tolerance of part 102 at the predetermined target temperature based on the imaging collected at step 403. Step 404 can include a sub step 404 a of determining a dimension of part 102 at the predetermined target temperature based on the imaging collected at step 403. A dimension can refer to any physical dimension of part 102 such as any length, width, height, thickness, angle of any portion of part 102.

Step 404 can include a sub step 404*b* of comparing the dimension of part 102 at the predetermined target temperature to a dimension of part 102 at a second temperature that is different from the predetermined target temperature. The compared dimensions of part 102 can be associated with the same region of part 102 but taken at different temperatures. In embodiments, the second temperature can be an ambient temperature and the predetermined target temperature can be any of the predetermined target temperatures discussed above including for example −80° C. In embodiments, process 400 can include determining the dimension of part 102 at the second temperature, which can include arranging part 102 on platen 106 of CT machine 104, imaging part 102 with CT machine 104 with part 102 at the second temperature; and determining the dimension of part 102 at the second temperature based on the imaging.

Step 404 can include a sub step 404*c* of evaluating the tolerance of part 102 from the comparison performed at step 404*b*. At step 404*c*, if the dimension of part 102 at the predetermined target temperature is within a tolerance (e.g., +/−10%) of the dimension of part 102 at the second temperature, process 400 can conclude at sub step 404*d* by with a determination that part 102 at the predetermined target temperature is within the tolerance.

Alternatively, if at step 404*c* the dimension of part 102 at the predetermined target temperature is outside of a tolerance (e.g., +/−10%) of the dimension of part 102 at the second temperature, process 400 can conclude at sub step 404*e* with a determination that part 102 at the predetermined target temperature is outside of the tolerance.

In embodiments, process 400 can be repeated to evaluate different dimensions of the same part 102. For example, part

102 can be a movable assembly such as a piston-syringe assembly and process 400 can be repeated with the piston moved to different positions for each CT scan to evaluate dimensions of part 102 at different piston positions. In embodiments, process 400 can include determining the dimension of part 102 at more than two temperatures. For example, process 400 can be repeated at a second target temperature that is different than the first target temperature. It can be of particular interest to scan polymeric parts above and below the glass transition temperature of the material.

It will be appreciated that the foregoing description provides examples of the disclosed machine. However, it is contemplated that other implementations of the invention may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated. All methods described herein can be performed in any suitable order unless otherwise indicated herein or otherwise clearly contradicted by context.

What is claimed is:

1. A system for scanning one or more parts, the system comprising:

- a computed tomography scan machine comprising a platen and a scanner comprising a X-ray source and a detector configured to perform at least one 360° computed tomography scan of the one or more parts positioned between the X-ray source and detector over a period of time; and
- a cooler arranged on the platen, wherein the cooler is configured to contain and maintain the one or more parts at a target temperature of 0° C. or below during the period of time, the cooler comprising:
  - a chamber;
  - a cooling medium provided within the chamber that is configured to maintain the one or more parts at the target temperature during the period of time;
  - a holder provided within the chamber, the holder being configured to hold the one or more parts within a region of the chamber that surrounds the one or more parts and that is configured to provide the scanner a 360-degree view of the one or more parts unobstructed by the cooling medium; and
  - a temperature sensor configured to measure the temperature within the chamber or the temperature of the one or more parts within the chamber during the period of time, the temperature sensor being arranged in the chamber and offset from a line of sight between the scanner and the one or more parts.

2. The system of claim 1 wherein the target temperature is −80° C. or below.

3. The system of claim 1, wherein the cooler comprises a wall that is radiolucent and that completely surrounds the holder.

4. The system of claim 1, wherein the cooling medium is a passive cooling medium.

5. The system of claim 1, wherein the one or more parts comprise one or more components or assemblies of a syringe-piston or of a vial-stopper system.

6. The system of claim 1, wherein the scanner is configured to perform a second 360° computed tomography scan of the one or more parts positioned between the X-ray source and detector over a period of time at a second target temperature.

7. The system of claim 1, wherein the cooling medium is an active cooling medium, and the system further comprises a controller configured to control the active cooling medium to maintain the one or more parts at the target temperature during the period of time.

8. The system of claim 7, wherein the controller receives the temperature within the chamber or the temperature of the one or more parts within the chamber from the temperature sensor to control the active cooling medium to maintain the one or more parts at the target temperature during the period of time.

9. A cooler for holding and maintaining one or more par at a target temperature during a computed tomography scan, the cooler comprising:

- a plurality of walls that define a chamber, the plurality of walls include side walls comprising a material that is radiolucent;
- a first and a second cooling medium respectively arranged in a top and a bottom of the chamber, the first and second cooling medium are together configured to cool the one or more parts to the target temperature and maintain the one or more parts at the target temperature during an entire period of the computed tomography scan; and
- a holder arranged between the first and second cooling medium that is configured to hold the one or more parts in a region of the chamber where the one or more parts are substantially surrounded by the side walls and an entirety of the one or more parts are between and spaced apart from each of the first and second cooling medium.

10. The cooler of claim 9, wherein the plurality of walls comprise a removable lid.

11. The cooler of claim 9, wherein the plurality of walls include at least one opening and the holder is an insert that extends through the at least one opening into the region of the chamber.

12. The cooler of claim 9, wherein the holder includes a first body and a second body, the first body includes a cavity configured to hold the one or more parts at an angle, and the second body is configured to be inserted into the first body to secure the one or more parts within the cavity.

13. The cooler of claim 12, wherein the first body separates the chamber into a first compartment and a second compartment that respectively house the first and second cooling mediums.

14. A method of evaluating a tolerance of one or more parts at a target temperature, the method comprising:

- cooling the one or more parts to the target temperature, wherein the target temperature is −80° C. or below;
- maintaining, using a temperature sensor and an active cooling medium, the one or more parts at the target temperature over a period of time;
- imaging the one or more parts using a computed tomography scan machine over the period of time;
- determining a characteristic of the one or more parts at the target temperature based on images of the one or more parts received from the computed tomography scan machine; and
- evaluating, based on the characteristic of the one or more parts at the target temperature relative to the characteristic of the one or more parts at a second target temperature that is different from the target temperature, the tolerance of the one or more parts at the target temperature.

15. The method of claim 14, wherein:

the characteristic of the one or more parts is a dimension of the one or more parts, evaluating the tolerance of the one or more parts at the target temperature comprises comparing the dimension of the one or more parts at the target temperature to a dimension of the one or more parts at the second target temperature.

16. The method of claim 15, wherein evaluating the tolerance of the one or more parts at the target temperature further comprises determining that the one or more parts at the target temperature is within the tolerance based on the comparing of the dimension of the one or more parts at the target temperature to the dimension of the one or more parts at the second target temperature.

17. The method of claim 15, wherein evaluating the tolerance of the one or more parts at the target temperature further comprises determining that the one or more parts at the target temperature is outside of the tolerance based on the comparing of the dimension of the one or more parts at the target temperature to the dimension of the one or more parts at the second target temperature.

18. The method of claim 15, further comprising determining the dimension of the one or more parts at the second target temperature by:

imaging the one or more parts using the computed tomography scan machine with the one or more parts at the second target temperature; and determining the dimension of the one or more parts at the second target temperature based on images of the one or more parts received from the computed tomography scan machine.

19. The method of claim 14, wherein the one or more parts are associated with a syringe-piston or vial stopper system.

20. The method of claim 14, wherein the target temperature is −80° C. or below.

* * * * *